(No Model.)

P. S. REDFIELD.
FLOAT AND SINKER ATTACHMENT.

No. 514,034. Patented Feb. 6, 1894.

Witnesses:
W. H. Thurston
S. J. Murphy

Inventor:
Paul S. Redfield

UNITED STATES PATENT OFFICE.

PAUL S. REDFIELD, OF PROVIDENCE, RHODE ISLAND.

FLOAT AND SINKER ATTACHMENT.

SPECIFICATION forming part of Letters Patent No. 514,034, dated February 6, 1894.

Application filed May 22, 1893. Serial No. 475,048. (No model.)

*To all whom it may concern:*

Be it known that I, PAUL S. REDFIELD, of the city and county of Providence, in the State of Rhode Island, have invented certain new and useful Improvements in Float and Sinker Attachments; and I do hereby declare the following specification, taken in connection with the accompanying drawings, forming a part of the same, to be a full, clear, and exact description thereof.

The object of the invention is to provide a convenient and efficient attachment for the floats or sinkers of fishing lines, whereby such float or sinker may be readily and quickly attached at any part of the line, or may be easily adjusted from one position to another upon the line.

To that end the invention consists in the combinations and arrangements of parts hereinafter described.

Figure 1:
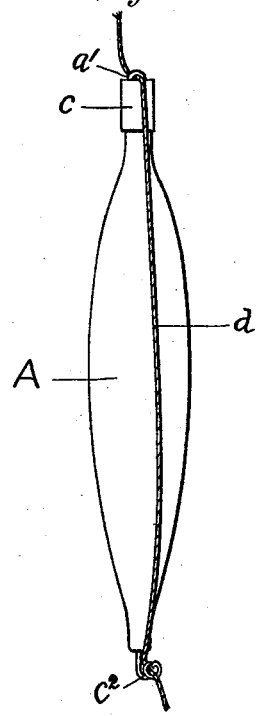
Figure 2:
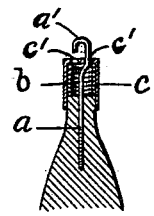
Figure 3:
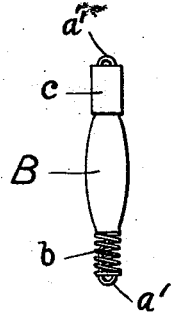

Referring to the drawings, Figure 1 represents a float provided with my improved attachment at one end thereof. Fig. 2 is a central longitudinal section of the upper part of Fig. 1, but showing the cap and spring depressed. Fig. 3 represents a sinker provided with one form of my improved attachment at one end and with a modification thereof at the other end; and Fig. 4 represents a modified form of attachment.

A represents a float which may be of any suitable material or construction. In the end of the float A is secured a piece of wire $a$ having its upper end bent into a U-form, or so as to form a sort of hook $a'$, as shown in Fig. 2. Surrounding the wire $a$ is arranged a spiral spring $b$. Surrounding the spring $b$ is a cap $c$ made of metal or other suitable material, the open end of which cap is arranged to surround and slide upon the end of the body of the float. The closed end of the cap is provided with two perforations $c', c'$, through one of which perforations the main body of the wire $a$ extends, thereby serving to guide the cap in its sliding movement. The other perforation $c'$ is adapted to receive the end of the hook portion $a'$ of said wire. One end of the spiral spring $b$ abuts against the end of the body of the float, and the other end abuts against the under side of the closed end of the cap $c$, as shown in Fig. 3, whereby the cap will be normally held in its outward position as shown in Fig. 1, and so as to close the entrance to the hook $a'$. When now it is desired to attach the float to a line $d$, it is only necessary to depress the cap $c$ against the action of the spring $b$, and into the position shown in Fig. 2, which will unclose the hook $a'$, and so that the line may be readily inserted therein. Upon releasing the cap $c$ it will be returned to its normal position by the spring $b$, and so as to close the hook $a'$ and clamp the line therein. The adjustment of the float from one position on the line to another may be likewise readily effected. If desired, the opposite end of the float may be provided with a similar attachment in place of the spiral coil $e^2$ shown in Fig. 1.

I have found in practice that, if desired, the cap $c$ may be omitted and the line be sufficiently clamped by the hook and spiral spring. Such an arrangement is shown at the lower end of the sinker B represented in Fig. 3.

Figure 4:
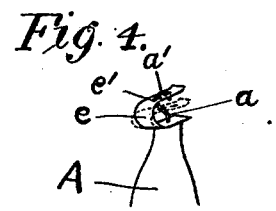

In place of the spiral spring or the spiral spring and cap, a flat U-shaped spring $e$ may be employed and arranged as shown in Fig. 4, one end of the U-spring being secured to the body of the float or sinker, and the other end being provided with a slot $e'$ to receive the hook end $a'$ of the wire $a$. In the construction shown in Fig. 4 the free end of the U-shaped spring may be readily depressed into the position indicated in dotted lines and so that the line may be inserted into the hook $a'$. Upon releasing the free end of said spring it will return to its normal position, closing the hook $a'$ and clamping the line between the spring and hook.

What I claim as my invention, and desire to secure by Letters Patent, is—

1. A float or sinker provided with an open hook and a spring in juxtaposition with said hook and co-operating therewith and acting to clamp the line in the bight of said hook, substantially as described.

2. The combination, with a float or sinker, of an open hook secured in the end thereof, and a coiled spring surrounding the body portion of said hook, and abutting against the end of the float or sinker, said spring being arranged to clamp the line in the bight of said hook, substantially as described.

3. An attachment for floats or sinkers composed of an open hook, a cap provided with a closed end, through which closed end the body portion of said hook extends, and a spring arranged to move said cap to close said hook and to clamp the line therein, substantially as described.

4. The combination, with a float or sinker, of an open hook secured in the end thereof, a cap provided with a closed end, through which closed end the body portion of said hook extends, and a spring arranged between the end of the float or sinker and the closed end of said cap, whereby when said cap is depressed the hook will be unclosed to receive the line, and when said cap is released the spring will act to cause said cap to close the hook and to clamp the line therein, substantially as described.

PAUL S. REDFIELD.

Witnesses:
W. H. THURSTON,
S. J. MURPHY.